(12) United States Patent
Verbowski

(10) Patent No.: US 10,823,252 B2
(45) Date of Patent: Nov. 3, 2020

(54) DEVICE FOR ENABLING ALTERATIONS IN THE EXTENSION OF VEHICLE SHOCKS

(71) Applicant: Larry Verbowski, Bay City, MI (US)

(72) Inventor: Larry Verbowski, Bay City, MI (US)

(*) Notice: Subject to any disclaimer, the term of this patent is extended or adjusted under 35 U.S.C. 154(b) by 161 days.

(21) Appl. No.: 15/713,771

(22) Filed: Sep. 25, 2017

(65) Prior Publication Data

US 2019/0093732 A1 Mar. 28, 2019

(51) Int. Cl.
*F16F 9/54* (2006.01)
*B60G 13/00* (2006.01)

(52) U.S. Cl.
CPC ............ *F16F 9/54* (2013.01); *B60G 13/003* (2013.01); *F16F 2230/0005* (2013.01)

(58) Field of Classification Search
CPC .... F16F 9/54; F16F 2230/0005; B60G 13/00; B60G 13/001
USPC ........... 280/661, 668, 86.75, 86.751, 86.753; 188/321.11
See application file for complete search history.

(56) References Cited

U.S. PATENT DOCUMENTS

| | | | | | |
|---|---|---|---|---|---|
| 1,931,945 | A | * | 10/1933 | Zerk | B60G 11/12 267/270 |
| 2,488,036 | A | * | 11/1949 | Pofcher | A61C 3/16 29/256 |
| 3,612,572 | A | * | 10/1971 | Raidel | B60G 11/107 280/86.75 |
| 3,679,029 | A | * | 7/1972 | Thomas | B60G 13/005 188/321.11 |
| 4,020,929 | A | * | 5/1977 | Goldin | F16F 9/54 188/321.11 |
| 4,313,617 | A | * | 2/1982 | Muramatsu | B60G 13/006 280/86.753 |
| 4,424,984 | A | * | 1/1984 | Shiratori | B60G 7/00 280/86.753 |
| 4,491,339 | A | * | 1/1985 | Mizumukai | B60G 13/006 188/321.11 |
| 4,706,987 | A | * | 11/1987 | Pettibone | B60G 3/205 280/86.753 |
| 4,733,884 | A | * | 3/1988 | Pettibone | B60G 7/001 280/86.753 |
| 5,104,141 | A | * | 4/1992 | Grove | B60G 13/006 280/86.753 |
| 5,193,787 | A | * | 3/1993 | Coopland, Jr. | F16F 1/38 267/220 |
| 5,301,977 | A | * | 4/1994 | Schlosser | B62D 17/00 280/86.75 |
| 5,433,470 | A | * | 7/1995 | Long | B60G 11/04 267/227 |
| 5,779,260 | A | * | 7/1998 | Reilly | B60G 15/07 280/86.754 |
| 6,068,275 | A | * | 5/2000 | Chino | B60G 9/02 280/124.112 |
| 6,877,591 | B1 | * | 4/2005 | Hso | B62K 25/286 188/321.11 |
| 6,904,641 | B2 | * | 6/2005 | Magoto | B60B 33/04 16/19 |
| 7,156,404 | B2 | * | 1/2007 | Krieger | B60G 3/20 280/124.155 |

(Continued)

FOREIGN PATENT DOCUMENTS

JP 02138529 * 5/1990

*Primary Examiner* — Vishal R Sahni

(57) ABSTRACT

A device and method for providing extension capability to an installable shock absorber for a vehicle.

4 Claims, 4 Drawing Sheets

(56) References Cited

U.S. PATENT DOCUMENTS

| | | | | |
|---|---|---|---|---|
| 7,163,215 B2 * | 1/2007 | Mathis | ................... | B65H 75/40 |
| | | | | 280/86.751 |
| 7,537,226 B1 * | 5/2009 | Collazo | ................. | B60G 11/12 |
| | | | | 267/260 |
| 7,891,679 B2 * | 2/2011 | Svartz | ................... | B60G 7/006 |
| | | | | 280/124.175 |
| 8,439,566 B2 * | 5/2013 | Connell | ................ | F16B 5/0225 |
| | | | | 384/40 |
| 8,590,912 B2 * | 11/2013 | McCarthy | .............. | B60G 11/10 |
| | | | | 280/124.163 |
| 8,979,105 B2 * | 3/2015 | McCarthy | .............. | B62D 17/00 |
| | | | | 280/124.163 |
| 9,315,222 B1 * | 4/2016 | Wetter | ..................... | B60G 9/02 |
| 2007/0052195 A1 * | 3/2007 | Collazo | ................. | B60G 11/12 |
| | | | | 280/124.175 |

* cited by examiner

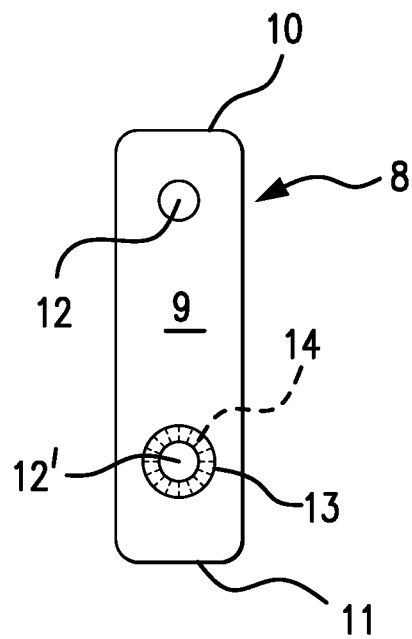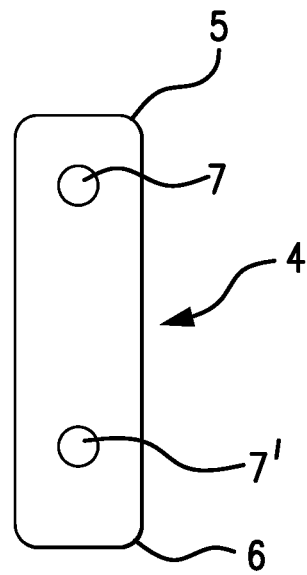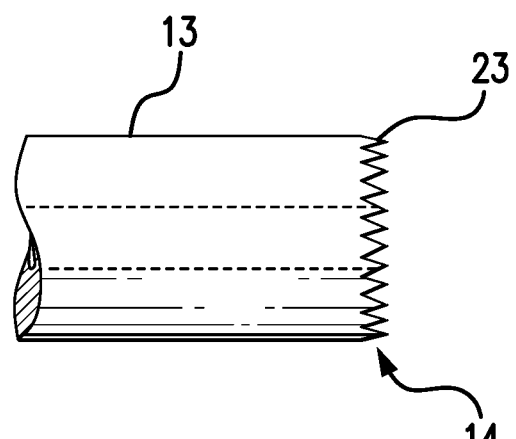

DEVICE FOR ENABLING ALTERATIONS IN THE EXTENSION OF VEHICLE SHOCKS

BACKGROUND OF THE INVENTION

This invention deals with devices and methods to enable alterations in extension capability to an installable shock absorber for a vehicle. The invention allows for a vehicle owner to avoid the added expense of purchasing a new shock absorber when vehicle alterations, such as the lifting or lowering of a vehicle suspension, necessitate alterations in shock extension.

Vehicle alterations, such as lifting or lowering the suspension, can necessitate the purchase of new shocks to accommodate a necessary change in shock absorber length. Such purchases can be obviated through the use of the present invention, which enables alterations in extension of a shock absorber at a fraction of the expense encumbered by the purchase of a new shock absorber.

Inventions serving a similar purpose to the present invention that are presently available on the market are more cumbersome to manufacture and install than the present invention and are not readily altered to accommodate various widths of shock absorbers or clevis tabs of vehicle suspension systems provided for securing shock absorbers. This is largely on account of these extension devices being single-pieced. The two-piece design of the present invention greatly simplifies manufacture and greatly facilitates alterations to accommodate various widths of clevis tabs and shock absorbers. Presently available shock extenders incorporate a bend in the product design to enable the simultaneous proper fit by a single-piece apparatus of both the inside of a shock absorber mount's clevis tab and the attachment of a vehicle shock absorber during installation.

This bend is not necessary in the present invention because it utilizes a two-piece design. Moreover, the mechanical strength of the present invention is superior to these presently available devices because it is not compromised by the incorporation of a bend in its design. Additionally, the two-piece nature of the present invention serves to simplify installation relative to available one-piece designs. What's more, the two-piece nature of the present invention greatly simplifies product manufacture.

Additionally, in one embodiment of the present invention the two-piece nature of the invention enables the incorporation of a unique and simple means of preventing rotation of the device for altering shock extension. Rotation of the device during vehicle operation could lead to undesired alterations in effective shock extension and a corresponding compromise of proper shock function. The inventors are unaware of any means for preventing rotation of a shock extension alteration device similar to that disclosed herein.

THE INVENTION

Thus, what is disclosed and claimed herein is a device for providing extension capability to an installable shock absorber for a vehicle. The device comprises in combination a first plate, and a second plate. The first plate has a top end and a bottom end and each end has an opening through it. The second plate has an inside surface, a top end and a bottom end. Each end of this second plate has an opening through it. The bottom end of the second plate has a hollow spacer shaft rigidly attached to its inside surface and in alignment with the bottom end opening.

Another embodiment of this invention is a method of providing a shock absorber extension capability comprising first providing the device described supra. Then, the opening in the bottom end of the second plate is aligned on the inside of a clevis tab of a vehicle suspension system provided for securing a shock absorber such that a bolt will pass through, first, the clevis tab, then the bottom end opening of the second plate, and, finally the hollow spacer shaft. Then the first plate bottom end opening is aligned on the outside of the clevis opposite the second plate. Next, a first threaded bolt is inserted through the clevis, then the bottom end of the second plate, then the hollow spacer shaft, then the opposite clevis tab and then through the bottom opening of said first plate. Then, a threaded nut is threaded on the first threaded bolt and tightened. Next, a second threaded bolt is threaded first through the opening in the top of the second plate, then through an attachment of a vehicle shock absorber, and finally through the top end opening of the first plate. Finally, a threaded nut is threaded on said second threaded bolt and tightened.

A further embodiment of this invention is a device for providing extension alteration capability to an installable shock absorber for a vehicle. The device comprised in combination first a first plate with a top end, a central area and a bottom end. The central area and the top end each have an opening through them. The bottom end of the first plate has a first edge and a second edge. Each edge has a tab and a portion on the bottom end extending between the tabs is essentially concave in shape. The second component of the combination is a second plate, which has an inside surface, a top end, and a bottom end. Each end of the second plate has an opening through it. The bottom end of the second plate has a spacer rigidly attached to its inside surface and in alignment with the bottom opening.

Another embodiment of the present invention is a method of providing extension alteration capability to a shock absorber. The method comprises first providing the aevice described immediately supra. Then, the opening in the bottom end of the second plate is aligned on the inside of a clevis tab of a vehicle suspension system provided for securing a shock absorber. The plate is aligned such that a bolt will pass through the clevis tab, the bottom end opening of the second plate, and the hollow spacer shaft. Then, a side of the first plate central portion is aligned on the outside of the clevis opposite the second plate. The tabs of the first plate are tooled to conform to the contour of a vehicle axel and to contact the axel. Next, a first threaded bolt is inserted through the clevis, then the bottom opening of the second plate, then the hollow spacer shaft, then the opposite clevis tab, and then through the central opening of the first plate. Then, a threaded nut is threaded on the first threaded bolt and tightened. Next, a second threaded bolt is inserted through the opening near the top of the second plate, through a bottom attachment of a vehicle shock absorber, and through the opening near the top of the first plate. Finally, a threaded nut is threaded on the second threaded bolt and tightened.

BRIEF DESCRIPTION OF THE DRAWINGS

FIG. 3 is a full side view of the second plate of an embodiment of the vehicle shock extender with a hollow spacer shaft rigidly attached.

FIG. 4 is a full side view of the first plate of an embodiment of the vehicle shock extender.

FIG. 6 is a partial side view of the non-rigidly attached end of the spacer shaft component of the vehicle shock extender showing its optional serrations.

DETAILED DESCRIPTION OF THE INVENTION

Figure 1:
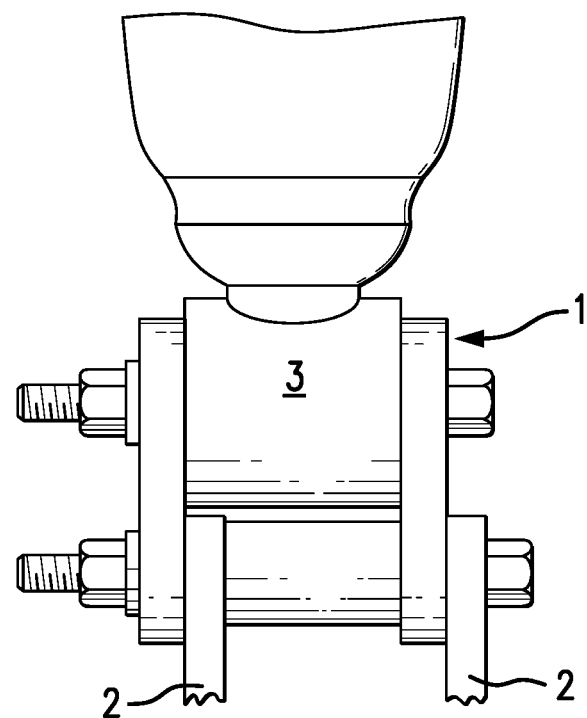
FIG. 1 is a full back view of an embodiment of the vehicle shock extender showing its context when installed.

FIG. 1 is a full back view of the vehicle shock extender 1 in an installed configuration. The device 1 serves to rigidly secure an end of a shock absorber 3 (not part of the invention) to a clevis 2 (not a part of the invention) that is, in turn, rigidly secured to a vehicle (not shown). The extender 1 functions to provide extension capability to an installable shock absorber 3 so that it is not necessary to purchase a new shock absorber, which is a much greater expense than the cost of the present invention, when vehicle alterations necessitate an extension of the length of the shock absorber 3.

Figure 2:
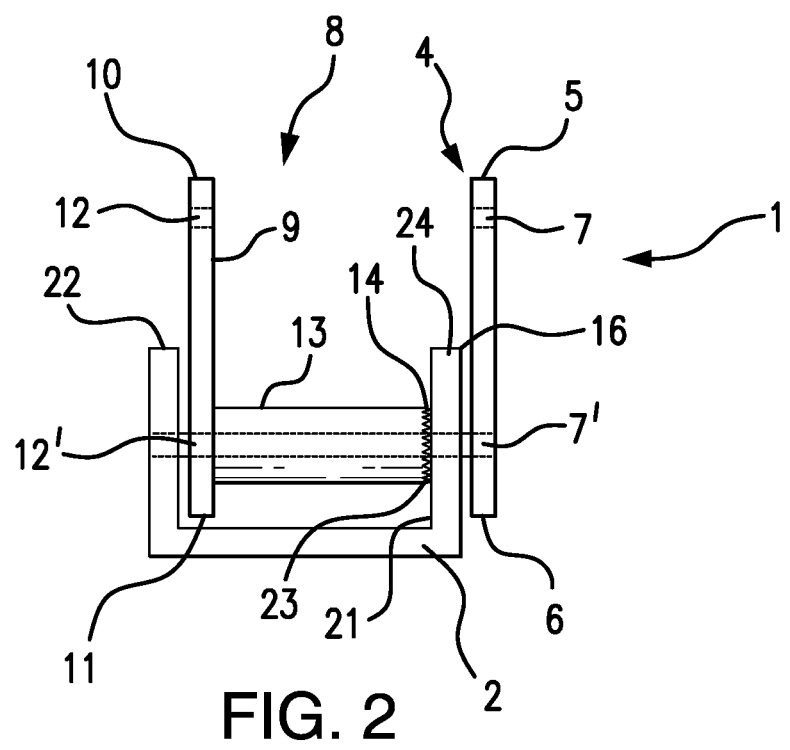
FIG. 2 is a full front view of an embodiment of the vehicle shock extender properly aligned with a clevis tab.

FIG. 2 shows a full front view of the vehicle shock extender 1 properly aligned with the shock mount clevis 2 of a vehicle for full installation. A full side view of the first plate of the device 4 is shown in FIG. 4. The first plate 4 has openings 7 through it near its top end 5 and bottom end 6. The first plate 4 is installed on the outer surface 16 of the clevis 2.

FIG. 3 shows a full side view of the second plate 8 of the device 1. The second plate 8 has openings 12 and 12' through its top end 10 and bottom end 11. At its bottom end 11 on the inside surface 9 is rigidly attached a hollow spacer shaft 13. The length of the spacer shaft 13 is selected so as to span the distance between the inner surface 9 of the second plate 8 and the opposing inner surface 21 of the clevis 2.

FIG. 6 is a partial side view of the spacer shaft 13 showing optional serrations 14 on the spacer shaft at its non-rigidly attached end 23 to prevent rotation when installed.

The shock extender can be manufactured of any suitably strong material, preferably metal, more preferably steel. The first and second plates of the device are of equal dimensions. The length of each plate, meaning the distance between top 10, 5 and bottom 11, 6, is selected so as to optimally secure a shock absorber to a clevis intended for rigidly securing a shock absorber to a vehicle.

Figure 5:
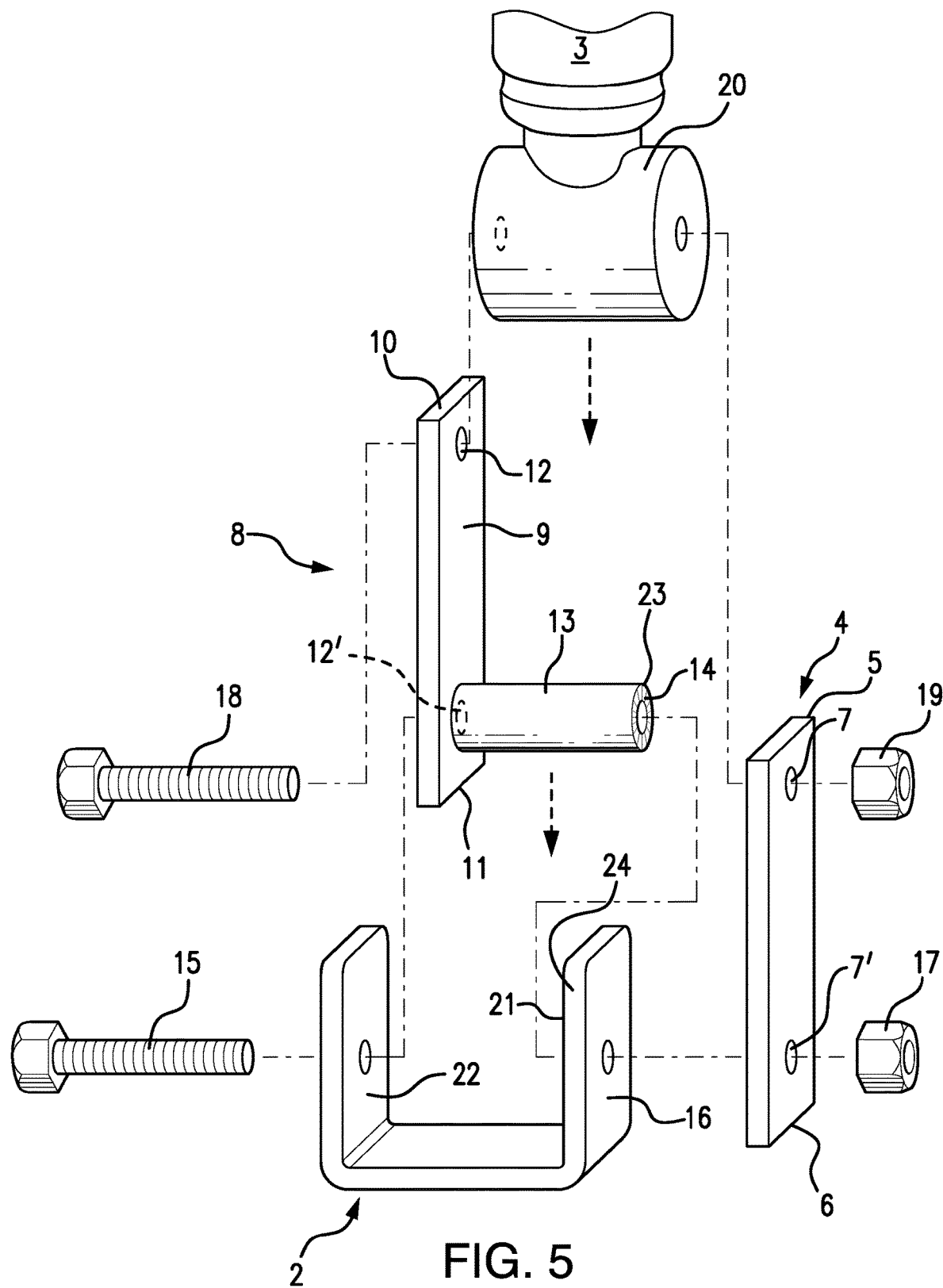
FIG. 5 is an exploded view of an embodiment of the vehicle shock extender in an installed configuration.

FIG. 5 shows an exploded view of the invention in an installed configuration. The bolts 18, 15, nuts 19, 17, clevis 2, and shock absorber 3 are not part of this invention.

The vehicle shock extender 1 is installed by the method of first aligning the bottom end 11 opening 12' of the second plate 8 on the inside 22 of a clevis tab 2 of a vehicle suspension system (provided for securing a shock absorber 3) such that a bolt 15 will pass first through the clevis tab 2, the bottom end 11 opening 12' of the second plate 9 and then the hollow spacer shaft 13. Then, the bottom end 6 opening 7' of the first plate 4 is aligned on the outside 16 of the clevis 2 opposite the second plate 8.

The first threaded bolt 15 is then inserted through the clevis 2, then the bottom end 11 opening 12 of the second plate 8, then through the spacer shaft 13, then through the opposite clevis tab 24 and then through the bottom end 6 opening 7' of the first plate 4. Next, threaded nut 17 is threaded onto the first threaded bolt 15 and tightened. The next step in installation is to insert a second threaded bolt 18 through the top end 10 opening 12 of the second plate 8, then through an attachment 20 of a vehicle shock absorber 3 and then through the top end 5 opening 7 of the first plate 4. Finally, a threaded nut 19 is threaded onto the second threaded bolt 18 and tightened.

The nuts 19, 17 and bolts 18, 15 used with the vehicle shock extender 1 should be manufactured of a material suitable to their purpose, preferably metal, more preferably steel.

Figure 7:
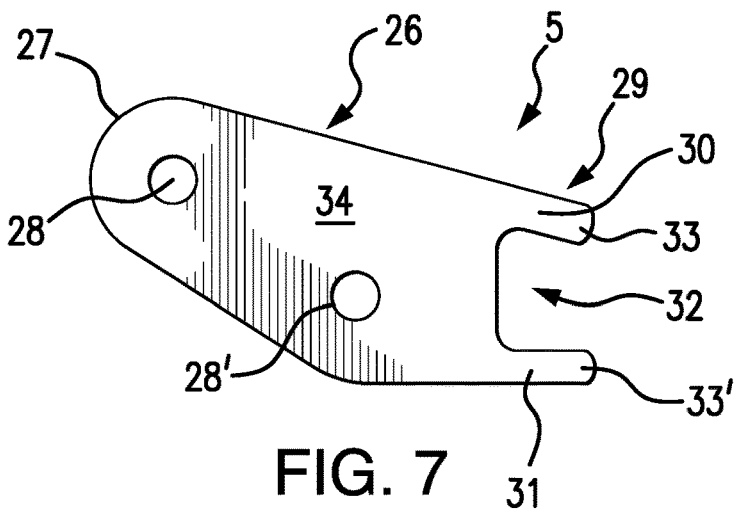
FIG. 7 is a full side view of the first plate of an embodiment of the vehicle shock extender.

A further embodiment of the device 1 for providing extension alteration capability to a shock absorber is very similar to the embodiment described supra but with one important modification. The modification is in the configuration of a first plate 4. The second plate 8 in this embodiment is identical to that described supra. FIG. 7 is a side view of this further embodiment of the configuration of a first plate 5. The plate 5 is configured to prevent plate 5 rotation when properly installed while also facilitating either shortening or lengthening of the effective extension of a vehicle shock absorber 3. The first plate 5 has openings 28 at its top end 27 and in its central area 26. The bottom end 29 of the first plate has tabs 33 on each of its edges 30 31. The portion 32 on the bottom end 29 extending between the tabs 33 is essentially concave in shape.

Figure 8:
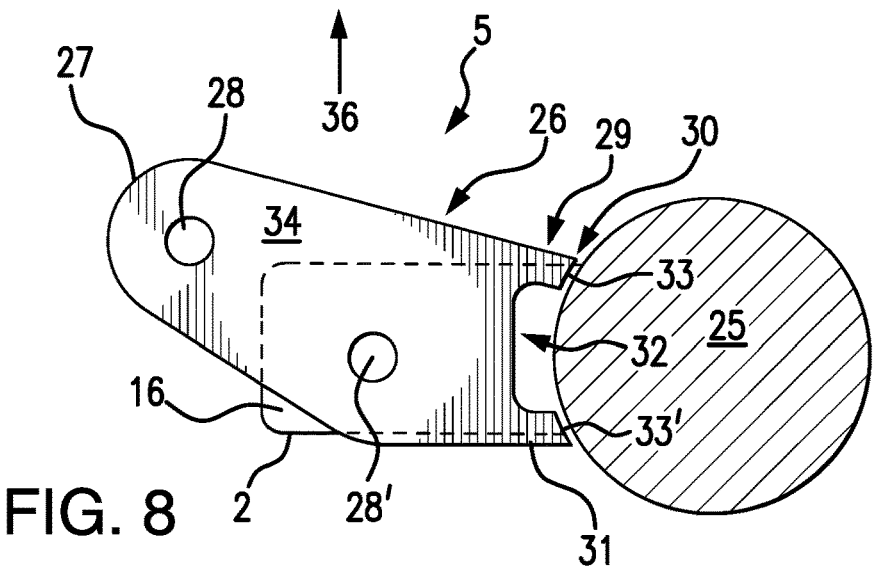
FIG. 8 is a full side view of the first plate of an embodiment of the vehicle shock extender properly aligned with a clevis for installation to enable an effective lengthening of shock extension on a vehicle.
Figure 9:
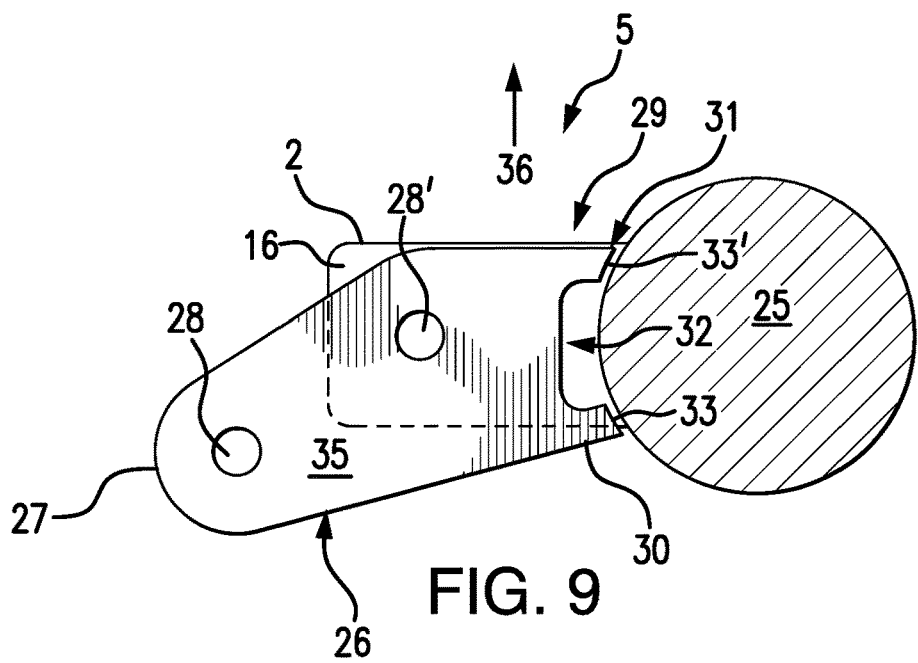
FIG. 9 is a full side view of the first plate of an embodiment of the vehicle shock extender properly aligned with a clevis for installation to enable an effective shortening of shock extension on a vehicle.

FIGS. 9 and 8 show how the second plate 5 may be aligned with an outer surface 16 of a clevis tab 2 for installation. The important distinguishing features of this embodiment of the invention become immediately apparent in view of these figures. First, due to the unique asymmetric shape of the first plate 5 in this embodiment, it may be aligned with either its front face 34 or its back face 35 in contact with the outer surface 16 of a clevis tab 2 and each alignment will have a different impact on the effective extension of a shock absorber 3. In this embodiment, when the front face 34 is aligned in contact with the clevis tab 2, as in FIG. 9, the opening 28 in the top 27 of the first plate 5 is lower than the opening 28' in the central area 28'. A shock absorber 3 installed from above 36 will then need to extend further in order to properly align with the opening 28 in the top 27 of the first plate 5 than would be the case if the opening 28 in the top 27 of the first plate were above the opening 28' in the central area 26, as shown in FIG. 8. FIG. 8 shows the back face 34 of the first plate 5 aligned in contact with the clevis tab 2 and how in this alignment the opening 28 in the top 27 of the first plate 5 is above the opening 28' in the central area 26 of the first plate 5. Therefore, the unique asymmetric shape of the first plate 5 in this embodiment enables either lengthening, FIG. 8, or shortening, FIG. 9, of effective shock 3 extension on a vehicle depending on whether the front face 34 or back face 35 of the first plate 5 is in aligned in contact with a clevis tab 2 in an installed configuration.

A further distinguishing feature of the present embodiment of the invention is the ability of the first plate 5 to prevent rotation of the device for providing extension alteration capability to a shock absorber. This resistance to rotation is provided through the tabs 33 of the first plate 5 contacting a vehicle axle 25. A shock absorber 3 secured to the opening 28 at the top 27 of the first plate 5 will impose torsional forces during vehicle operation centered at the opening 28 in the central area 26 of the first plate 5 where the plate 5 will be rigidly secured to the clevis 2. If a nut (not shown) securing the first plate 5 to the clevis 2 is not sufficiently tight the torsional forces will need to be balanced by countering forces by some mechanism other than the tightness of the nut or the plate 5 may rotate along an axis centered in the opening 28' in the central area of the plate. This rotation would be highly undesirable because it could lead to alterations in effective shock 3 extension that could compromise proper shock 3 function during vehicle operation. The tabs 33 of the present embodiment of the invention provide a mechanism for resisting these torsional forces through being in direct physical contact with the axle 25 of a vehicle to provide torsional forces balancing those imposed by a shock absorber 3, as described supra.

Another important distinguishing feature of the first plate 5 in this embodiment is the concave shape of the portion 32 on the bottom end 29 of the plate 5 extending between the tabs 33. This shape is configured so as to ensure that the tabs 33 are the only points of contact between the first plate 5 and the axle 25. This is a feature that facilitates ease of installation because when one is installing the first plate 5 it is then necessary only to tool the tabs 33 to properly configure to the axis of and physically contact a vehicle axle 25 rather than the entire bottom 29 of the first plate. The tabs 33 of the first plate 5 are manufactured to be of a length sufficient to allow a user to be able to tool them to be of sufficient length to properly conform to and contact the contour of a vehicle axle 25 when installed for a particular application.

A final distinguishing feature of the first plate 5 in this embodiment is that alterations in the length of each tab 33 may be used as means to further alter the effective extension of a shock absorber 3. For example, if in FIG. 8 the tab 33 on the $1^{st}$ edge 30 of the plate were lengthened and the tab 33 on the $2^{nd}$ edge 31 were shortened the position of the opening 28 in the top of the first plate 5 would be altered such that a shock absorber 3 coming from above 36 would need to extend slightly further to properly align with the opening 28 in the top 28 of the fist plate 5. This would lead to a shortening, in this instance, of the effective extension of the shock absorber 3. It can be seen, therefore, that through proper tooling of the tabs 33 one can make refinements to the alterations in shock extendibility facilitated by the device for enabling alterations in vehicle shock extension. These refinements are in addition to the alterations in shock 3 extension described supra facilitated by configuring the front face 34 or back face 35 of the first plate 5 to be in contact with a clevis 2 when installed.

Another embodiment of the invention is a method using the first plate 5 immediately described supra in combination with the second plate 8 described supra to provide extension alteration capability to a shock absorber 3. First, the bottom end 29 of the second plate is aligned on the inside 22 of a clevis tab 2 of a vehicle suspension system provided for securing a shock absorber 3 such that a bolt 15 will pass through the clevis tab 2, the bottom end opening of the second plate 12', and the hollow spacer shaft 13. A front side 34 (alternatively referred to as a face) or back side 35 of the first plate 5 is aligned with the outside 16 of the clevis 2 opposite the second plate 8. Then the tabs 33 of the first plate 5 are tooled to conform to the couture of a vehicle axle 5 and facilitate any desired refinements in effective alterations in shock extension, as described supra. Next, a first threaded bolt 15 is inserted through the clevis 2, then the bottom opening of the second plate 12', then the hollow spacer shaft 13, then the opposite clevis tab 24, and then through the opening 28' in the central area 26 of the first plate 5. Then, a threaded nut 17 is threaded onto the first threaded bolt 15 and tightened. Next, a second threaded bolt 18 is inserted through the opening 12 near the top 10 of the second plate 8, through a bottom attachment of a vehicle shock absorber 20, and then through the top end 27 opening 28 of the first plate 5. Finally, a threaded nut 19 is threaded onto the second threaded bolt 18 and tightened.

The nuts 19, 17 and bolts 18, 15 used with the vehicle shock extender 1 as well as the extender 1 itself should be manufactured of a material suitable to their purpose, preferably metal, more preferably steel.

What is claimed is:

1. A method of providing a shock absorber extension capability, said method comprising:
   A. providing a device for providing extension capability to an installable shock absorber for a vehicle, said device comprising in combination:
      a. a first plate having a first top end and a first bottom end, each said first top end and first bottom end having an opening therethrough;
      b. a second plate having an inside surface, a second top end, and a second bottom end, each said second top end and said second bottom end having an opening therethrough;
      c. said second plate second bottom end having on said inside surface, rigidly attached thereto, and in alignment with said second bottom opening, a hollow spacer shaft;
   B. aligning said opening in said bottom end of said second plate on the inside of a clevis tab of a vehicle suspension system provided for securing a shock absorber such that a bolt will pass through said clevis tab, said bottom end opening of said second plate, and said hollow spacer shaft;
   C. aligning said first plate bottom end opening on the outside of said clevis opposite said second plate;
   D. inserting a first threaded bolt through said clevis, then said bottom end of said second plate, then said hollow spacer shaft, then said opposite clevis tab and then through said bottom opening of said first plate;
   E. threading a threaded nut on said first threaded bolt and tightening said nut;
   F. inserting a second threaded bolt through said opening in said top of said second plate, through a bottom attachment of a vehicle shock absorber, then through said top end opening of said first plate;
   G. threading a threaded nut on said second threaded bolt and tightening said nut.

2. The device in the method as claimed in claim 1 wherein, in addition, a non-rigidly attached end of said hollow spacer shaft is serrated to prevent rotation of said hollow spacer shaft when installed.

3. A method of providing extension alteration capability to a shock absorber, said method comprising:
   A. providing a device for providing extension alteration capability to an installable shock absorber for a vehicle, said device comprising in combination:
      a. a first plate having a first top end, a central area and a first bottom end, said central area and said first top end each having an opening therethrough;
      b. said first bottom end of said first plate having a first edge and a second edge, said first edge and said second edge each having a tab and a portion on said first bottom end extending between said tabs essentially concave in shape;

c. a second plate having an inside surface, a second top end, and a second bottom end, each said second top end and said second bottom end having an opening therethrough;

d. said second plate second bottom end having on said inside surface, rigidly attached thereto, and in alignment with said second bottom opening, a hollow spacer shaft;

B. aligning said opening in said bottom end of said second plate on the inside of a clevis tab of a vehicle suspension system provided for securing a shock absorber such that a bolt will pass through said clevis tab, said bottom end opening of said second plate, and said hollow spacer shaft;

C. aligning a side of said first plate central portion on the outside of said clevis opposite said second plate and tooling said tabs to conform to the couture of a vehicle axle and contact said axle;

D. inserting a first threaded bolt through said clevis, then said bottom opening of said second late, then said hollow spacer shaft, then said opposite clevis tab and then through said central opening of said first plate;

E. threading a threaded nut on said first threaded bolt and tightening said nut;

F. inserting a second threaded bolt through said opening in said top of said second plate, through a bottom attachment of a vehicle shock absorber, then through said top end opening of said first plate;

G. threading a threaded nut on said second threaded bolt and tightening said nut.

4. The device in the method as claimed in claim 3 wherein, in addition, a non-rigidly attached end of said hollow spacer shaft is serrated to prevent rotation of said hollow spacer shaft when installed.

* * * * *